United States Patent
Cui

(10) Patent No.: US 8,825,891 B2
(45) Date of Patent: Sep. 2, 2014

(54) METHOD AND DEVICE FOR MESSAGE RETRANSMISSION

(75) Inventor: Jinlong Cui, Guangdong (CN)

(73) Assignee: ZTE Corporation, Shenzhen (CN)

( * ) Notice: Subject to any disclaimer, the term of this patent is extended or adjusted under 35 U.S.C. 154(b) by 26 days.

(21) Appl. No.: 13/258,091

(22) PCT Filed: Mar. 23, 2010

(86) PCT No.: PCT/CN2010/071236
§ 371 (c)(1),
(2), (4) Date: Sep. 21, 2011

(87) PCT Pub. No.: WO2010/145242
PCT Pub. Date: Dec. 23, 2010

(65) Prior Publication Data
US 2012/0102216 A1    Apr. 26, 2012

(30) Foreign Application Priority Data
Jun. 17, 2009    (CN) .......................... 2009 1 0150833

(51) Int. Cl.
*G06F 15/16* (2006.01)
*H04L 29/08* (2006.01)
*H04L 1/16* (2006.01)

(52) U.S. Cl.
CPC ............ *H04L 1/1621* (2013.01); *H04L 69/326* (2013.01)
USPC ........................................................ 709/232

(58) Field of Classification Search
USPC .................................................. 709/230–238
See application file for complete search history.

(56) References Cited

U.S. PATENT DOCUMENTS

| | | | |
|---|---|---|---|
| 6,553,336 B1 * | 4/2003 | Johnson et al. ............... | 702/188 |
| 6,983,409 B1 | 1/2006 | Vollmer et al. | |
| 8,116,313 B2 * | 2/2012 | Hasegawa et al. ............ | 370/390 |
| 2012/0093022 A1 | 4/2012 | Wang | |

FOREIGN PATENT DOCUMENTS

| | | |
|---|---|---|
| CN | 101009536 A | 8/2007 |
| CN | 101047979 A | 10/2007 |
| JP | 2010518683 A | 5/2010 |
| JP | 2010519868 A | 6/2010 |
| JP | 2011514734 A | 5/2011 |
| JP | 2011521537 A | 7/2011 |

OTHER PUBLICATIONS

International Search Report in international application No. PCT/CN2010/071236, mailed on Jul. 1, 2010.
English Translation of the Written Opinion of the International Search Authority in international application No. PCT/CN2010/071236, mailed on Jul. 1, 2010.

* cited by examiner

Primary Examiner — Vivek Srivastava
Assistant Examiner — Sibte Bukhari
(74) Attorney, Agent, or Firm — Oppedahl Patent Law Firm LLC

(57) ABSTRACT

The present invention provides a method and device for message retransmission. The method comprises: constructing a first status report by a receiving terminal according to a message to be retransmitted, reading a message serial number of a truncated NACK which is truncated by an available bandwidth from the first status report, calculating a difference value between a front edge serial number of a receiving window of the receiving terminal and the message serial number of the truncated NACK, comparing the difference value with a given threshold, and taking a part before a truncation site as a second status report; constructing a third status report according to a comparison result and the second status report; sending the third status report by the receiving terminal; and retransmitting the message by a sending terminal according to the received third status report. The device for message retransmission is also provided, and comprises a threshold comparison module, a status report constructing module, a status report sending module and a retransmission module. By the method and device, it is achieved that under various status situations of the data transmission window, the air interface data transmission may be performed in time and the data transmission speed and efficiency are improved.

5 Claims, 8 Drawing Sheets

METHOD AND DEVICE FOR MESSAGE RETRANSMISSION

TECHNICAL FIELD

The present invention relates to the field of mobile communication, in particular to a method and a device for message retransmission.

BACKGROUND

Radio Link Control (RLC) protocol layer is a sub-layer of Layer 2 (L2) in radio interface protocol stack of Long Term Evolution (LTE), located between a Media Access Control (MAC) layer and a Packet Data Convergence Protocol (PDCP) layer. The RCL protocol layer has functions including link control, segmentation, reorganization, cascading, user data transmission, error correction, protocol error detection, restoration and so on, and provides segmentation and retransmission services for user and control data.

Each RLC protocol entity is configured by the Radio Resource Control (RRC) layer, and includes three data transmission modes: Transparent Mode (TM), Unacknowledged Mode (UM) and Acknowledged Mode (AM).

For an Automatic Repeat Request (ARQ) in the acknowledged mode, first, a status report is sent to a sending terminal by a receiving terminal; and then the sending terminal determines which Protocol Data Unit (PDU) messages have been received by the receiving terminal and which PDU or PDU fragments have not yet been received according to ACK_SN and NACK_SN in the status report, and retransmits the PDU messages that have not been received to the receiving terminal, thereby guaranteeing the reliability of data transmission.

According to 36.322 protocol, there are two ways for triggering the status report: the RLC sending terminal triggers the status report by means of polling (a polling timer is time out); the RLC receiving terminal detects a failure of the PDU reception (a rearrangement timer is time out). In the 36.322 protocol, the packaging process of status report under the acknowledged mode is described as follows: for PDUs that have not been received completely within the rearrangement detection interval of the receiving window, the status report is packaged according to the serial numbers of the PDUs (that is, the serial numbers of the messages that have not been received completely) ascending from smaller to larger in turn, until the size of the status report meets the size of the available bandwidth indicated by the lower layer.

FIG. 1 and FIG. 2 respectively show schematic diagrams when the data transmission window stays in moving status and halt status in related technologies, wherein the window sizes of both the sending window and the receiving window are Window_Size=512, window element being shadow indicates that a whole PDU has been received, half of the window being shadow indicates that only a part of the PDU has been received, still one or more PDU fragments have not been received.

FIG. 1 shows the schematic diagram when the data transmission window stays in moving status in related technologies. Specifically, a minimum serial number of the PDU that has not been received by the receiving window is i>0, that is, VR(R)=i>0, while VR(H)=512, so VR(H)−VR(R)>512=Window_Size, indicating that the receiving window is not full and is in moving status. At this time, the sending window is also in moving status, therefore VT(S) can move backwards to send new message data.

However, during transmission of air interface data, a case in which the window stays in halt status is also possible. FIG. 2 shows the schematic diagram when the data transmission window stays in halt status in related technologies. Specifically, the minimum serial number of the PDU that has not been received by the receiving window is 0, that is, VR(R)=0, while VR(H)=512, so VR(H)−VR(R)=512=Window_Size, indicating that the receiving window is full and stays in halt status. When the receiving window is in halt status, the sending window is also undoubtedly in halt status (as Window_Size=VT(S)−VT(A), at this time, VT(S)≥VR(H) and VT(A)≤VR(R)), and VT(S) is unable to move backward to send new message data. The halt status ends only when the PDU with the serial number of 0 is retransmitted by the sending terminal and acknowledged of its receiving by the receiving terminal. Therefore, when the window stays in halt status, the data transmission is interrupted and the transmission speed of air interface data is seriously affected.

FIG. 3 shows a schematic diagram of the status report in related technologies. As shown in FIG. 3, each line of 8 bits in the status report represents 1 byte, and each status report at least includes one ACK_SN, several NACKs and several E1s and E2s. ACK_SN (10 bits) represents the final serial number position of the status report detection interval, that is, what the status report reports to the sending terminal is the reception situation of messages with the serial numbers before the ACK_SN. NACK is composed of NACK_SN and SO domain (optional), wherein NACK_SN (10 bits) indicates that the PDU or PDU fragment with the message serial number being SN has not been received. When it is the PDU fragment that has not been received, the NACK further includes an SO domain including an SOstart (15 bits) and an SOend (15 bits) for indicating the start position and end position of the unreceived PDU fragment in the PDU. The E1 is used for identifying whether there is a further NACK following the ACK_SN/NACK, and E2 is used for identifying whether there is an SO domain following the NACK_SN.

Scheduling bandwidth, also called available bandwidth, refers to that available scheduling bandwidth allocated for RLC by the MAC according to the size of message data to be sent when there is message data to be transmitted in the RLC buffer and a Buffer Status Report (BSR) is sent to the MAC. The available scheduling bandwidth is generally unequal to the size of the message data to be sent, and the packaging principle of RLC is to send message data as much as possible according to the size of the available bandwidth. When RLC retransmits a PDU, if the scheduling bandwidth is greater than the size of the data to be sent, MAC layer needs to add a Padding after the MAC PDU to adapt to the scheduling bandwidth; if the scheduling bandwidth is smaller than the size of the message data to be sent, the PDU to be retransmitted needs to be divided into fragments. Under good air interface situation, generally, the status report can be scheduled sufficiently, that is, the NACKs corresponding to the rearrangement detection interval of the receiving terminal can all be sent to the sending terminal; while under poor air interface situation, the status report is sent as much as possible according to the size of the bandwidth.

Under certain conditions, RLC entity receiving terminal has retransmission requirements for certain PDU fragments, if the available bandwidth is insufficient at this time so that the NACK with the message serial number being VR(R) is not included in the status report sent to the sending terminal by the receiving terminal, only when a new turn of status report is triggered when the arrangement timer or polling timer is time out again, it is possible to construct the NACK with the message serial number being VR(R) in a status report of a new round to request the sending terminal to retransmit PDU fragments corresponding to VR(R).

A method for message retransmission has been disclosed in related technologies, wherein when the receiving terminal constructs a status report, an NACK truncated by the available bandwidth is abandoned without sending, and only the NACK before the truncated NACK is constructed into the status report to be sent. As shown in FIG. 3, the available bandwidth of RLC is only 13 bytes far less than the length of the status report corresponding to the arrangement detection interval, the SOend domain of the third NACK is just truncated by the available bandwidth and unable to be sent completely. At this time in the method for message retransmission, only a status report including the previous two NACKs is sent and the third NACK truncated by the available bandwidth is abandoned, that is, only a status report of 9 bytes is sent.

The inventor found that in the method for message retransmission in related technologies, the NACK truncated by the available bandwidth is abandoned no matter under which status of the data transmission window, resulting in that under a case in which the window is full to halt, the halt status can only be released after at least one arrangement timer cycle or polling timer cycle, thereby resulting in air interface data transmission delay and low transmission speed.

SUMMARY

The purpose of the present invention is to provide a message retransmission solution, so as to effectively avoid the problem that in the method for message retransmission in related technologies, an NACK truncated by the available bandwidth is abandoned no matter under which status of the data transmission window, resulting in air interface data transmission delay and low transmission speed under a case in which the window is full to halt.

In the embodiment of the present invention, a method for message retransmission is provided and comprises: constructing a first status report by a receiving terminal according to a message to be retransmitted, reading a message serial number of a truncated non-acknowledgement (NACK) which is truncated by an available bandwidth from the first status report, calculating a difference value between a front edge serial number of a receiving window of the receiving terminal and the message serial number of the truncated NACK, comparing the difference value with a given threshold, and taking a part before a truncation site as a second status report; constructing a third status report according to a comparison result and the second status report; sending the third status report by the receiving terminal; and retransmitting the message by a sending terminal according to the received third status report.

Further, in the described method for message retransmission, the step of constructing the third status report according to the comparison result and the second status report may comprise: if the difference value is less than the given threshold, abandoning the truncated NACK in the second status report to obtain the third status report.

Further, in the described method for message retransmission, the step of constructing the third status report according to the comparison result and the second status report may comprise: if the difference value is greater than the given threshold and the message serial number of the truncated NACK is equal to that of a previous NACK in the second status report, abandoning the truncated NACK in the second status report, and setting an end position of a retransmission segmentation interval of the previous NACK to be 0x7FFF to obtain the third status report.

Further, in the described method for message retransmission, the step of constructing the third status report according to the comparison result and the second status report may comprise: if the difference value is greater than the given threshold and the message serial number of the truncated NACK is not equal to that of the previous NACK in the second status report, constructing the third status report according to a position of the truncation site.

Further, in the described method for message retransmission, the step of constructing the third status report according to the comparison result and the second status report may comprise: if the difference value is greater than the given threshold and the truncated NACK is a first NACK in the second status report, constructing the third status report according to the position of the truncation site.

Further, in the described method for message retransmission, the step of constructing the third status report according to the position of the truncation site may comprise: if the truncation site is within an SO domain of the truncated NACK, abandoning the SO domain in the second status report to obtain the third status report.

Further, in the described method for message retransmission, the step of constructing the third status report according to the position of the truncation site may comprise: if the truncation site is not within an SO domain of the truncated NACK, abandoning the truncated NACK in the second status report to obtain the third status report.

On the other hand, in the embodiment of the present invention, a device for message retransmission is also provided and comprises: a threshold comparison module for constructing a first status report according to a message to be retransmitted, reading a message serial number of a truncated non-acknowledgement (NACK) which is truncated by an available bandwidth from the first status report, calculating a difference value between a front edge serial number of a receiving window of a receiving terminal and the message serial number of the truncated NACK, comparing the difference value with a given threshold, and taking a part before a truncation site as a second status report; a status report constructing module for constructing a third status report according to a comparison result and the second status report; a status report sending module for sending the third status report; and a retransmission module for retransmitting the message according to the received third status report.

Further, in the described device for message retransmission, the status report constructing module may comprise: a determination unit for determining a status of the message to be retransmitted according to the comparison result and a position relationship among the truncation site, the truncated NACK and the first status report; and an adjustment unit for adjusting the second status report according to the status of the message to be retransmitted to obtain the third status report.

Further, the described device for message retransmission may further comprise: a message receiving module for receiving the message from a sending terminal; a message delivery module for delivering the message; and a status report triggering module for triggering the first status report according to the message.

In the embodiment, the difference value between the front edge serial number of the receiving window of the receiving terminal and the message serial number of the truncated NACK is firstly calculated, the difference value is compared with the given threshold, and then the second status report is adjusted according to the comparison result to obtain the third status report. As the comparison result contains the status information of the data transmission window, different construction methods can be adopted with respect to different status of the data transmission window to obtain the third status report; therefore, under various status situations of the data transmission window, air interface data transmission can be performed in time, the air interface data transmission speed and efficiency are improved, and the problem is effectively avoided that in the method for message retransmission in related technologies, the NACK truncated by the available bandwidth is abandoned no matter under which status of the data transmission window, resulting in air interface data transmission delay and low transmission speed under a case in which the window is full to halt.

BRIEF DESCRIPTION OF THE DRAWINGS

Drawings elaborated herein are only provided for further understanding of the present invention and form a part of the application; illustrated embodiments of the present invention and elaboration thereof are used for explaining the present invention without forming any improper limit for the present invention. In the drawings.

DETAILED DESCRIPTION

The present invention will be described in details with reference to drawings and in combination with embodiments.

Figure 4:
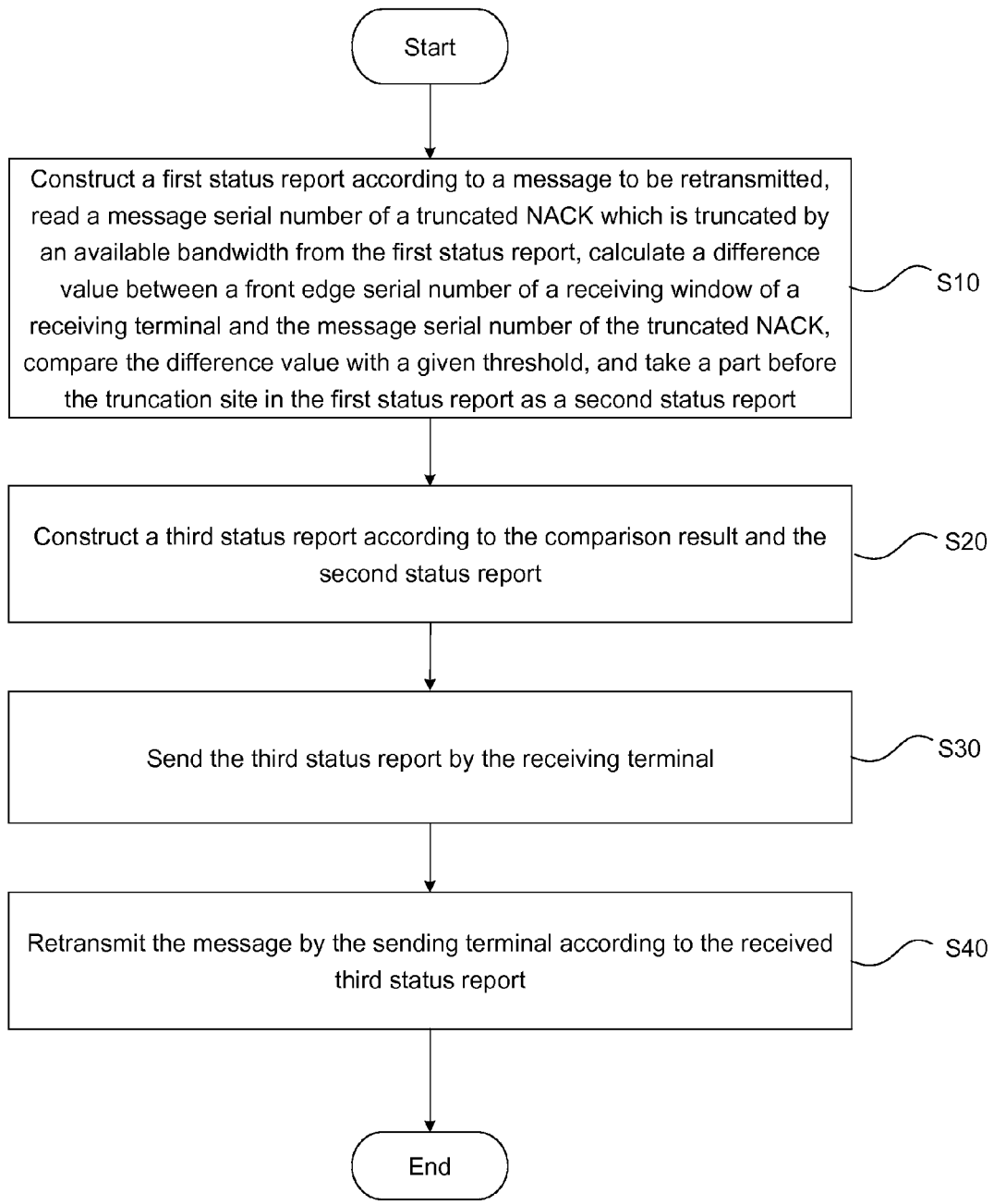
FIG. 4 shows a flow chart of a method for message retransmission according to an embodiment of the present invention.

FIG. 4 shows a flow chart of a method for message retransmission according to an embodiment of the present invention; the method for message retransmission may be applied in a radio link control layer and comprises the following steps:

Step S10: constructing a first status report according to a message to be retransmitted, reading a message serial number NACK_SN of a truncated NACK which is truncated by an available bandwidth from the first status report, calculating a difference value X between a front edge serial number VR(H) of a receiving window of a receiving terminal and the message serial number NACK_SN of the truncated NACK, comparing the difference value X with a given threshold $X_T$, and taking a part before the truncation site in the first status report as a second status report;

Step S20: constructing a third status report according to the comparison result and the second status report;

Step S30: sending the third status report by the receiving terminal; and

Step S40: retransmitting the message by the sending terminal according to the received third status report.

In Step S10 of the embodiment above, first, the difference value X between the front edge serial number VR(H) of the receiving window of the receiving terminal and the message serial number NACK_SN of the truncated NACK is calculated, wherein the front edge serial number VR(H) of the receiving window is the maximum value of the message serial number within the receiving window, X is the distance between the NACK_SN and the front edge serial number VR(H) of the receiving window and X∈[0, Window_Size]. The difference value X is compared with the given threshold $X_T$, and the part before the truncation site in the first status report is taken as the second status report. $X_T$ is used as a standard for determining the status of the data transmission window, therefore, the current status of the data transmission window can be obtained by comparison of X and $X_T$: if X∈[0, $X_T$), it is indicated that the receiving window is in good moving status; if X∈[$X_T$, Window_Size], it is indicated that the receiving window is to be full to halt. In step S20, the status of the receiving window can be obtained according to the comparison result, when the receiving window stays in different status, different construction methods can be respectively adopted to obtain the third status report. In step S30, the receiving terminal sends the third status report to the sending terminal. In step S40, the sending terminal retransmits the message according to the third status report from the receiving terminal. In the embodiment, under various status situations of the data transmission window, air interface data transmission can be performed in time, the air interface data transmission speed and efficiency are improved, and the problem is effectively avoided that in the method for message retransmission in related technologies, the NACK truncated by the available bandwidth is abandoned no matter under which status of the data transmission window, resulting in air interface data transmission delay and low transmission speed under a case in which the window is full to halt.

Preferably, in the described method for message retransmission, step S20 specifically comprises: if the difference value X is less than the given threshold $X_T$, abandoning the truncated NACK in the second status report to obtain the third status report.

In the embodiment, the given threshold can be set to be $X_T$=Window_Size−N, wherein N is an integer and N∈(0, Window_Size/2), if the difference value X is less than the given threshold $X_T$, that is, X∈(0, Window_Size−N), it is indicated that the receiving window is in good moving status, at this time, the air interface data transmission is unobstructed, the retransmission request for the PDU or PDU fragment corresponding to the truncated NACK can be sent in a status report of the next round, therefore, when the third status report is constructed, the truncated NACK in the second status report is abandoned. As the receiving window is in good moving status at this time, it is unnecessary to retain the truncated NACK when the third status report is constructed, thereby saving air interface transmission resources.

Preferably, in the described method for message retransmission, step S20 specifically comprises: if the difference value is greater than the given threshold, and the message serial number of the truncated NACK is equal to that of a previous NACK in the second status report, abandoning the truncated NACK in the second status report, and setting an end position of a retransmission segmentation interval of the previous NACK to be 0x7FFF to obtain the third status report.

In the embodiment, it is set that $X_T$=Window_Size−N, so if the difference value X is greater than the given threshold $X_T$, that is, X∈[Window_Size−N, Window_Size], it is indicated that the receiving window is to be full to halt. At this time, if the message serial number of the truncated NACK is equal to that of the previous NACK in the second status report, it is indicated that the PDU fragment requested for retransmission by the truncated NACK and the PDU fragment requested for retransmission by the previous NACK belong to a same PDU, and the PDU fragment requested by the truncated NACK is the subsequent PDU fragment of that requested by the previous NACK. However, due to limit of the available bandwidth, it is unable to completely represent the information of the subsequent PDU fragment to request retransmission by the sending terminal, so the truncated PDU is abandoned and the end position of the PDU fragment corresponding to the previous NACK is modified to be 0x7FFF, 0x7FFF corresponds to the end position of the PDU, that is, it is represented in the previous NACK that the PDU fragment within the segmentation interval of [SOstart, 0x7FFF], namely, the PDU fragment from SOstart to the end, are requested for retransmission. Under the condition that it is unable to completely represent the information of the PDU fragment corresponding to the truncated NACK due to limited available bandwidth, the embodiment fully utilizes the request chance of the previous NACK having the same message serial number as the truncated NACK, to represent the retransmission request for the PDU fragment originally requested by the truncated NACK in the status report of this round, thereby accelerating the progress of message retransmission, reducing or even eliminating the possibility that the receiving window is to be full to fall in halt status, and improving the air interface data transmission speed and efficiency.

Preferably, in the described method for message retransmission, step S20 specifically comprises: if the difference value is greater than the given threshold and the message serial number of the truncated NACK is not equal to that of the previous NACK in the second status report, constructing the third status report according to the position of the truncation site.

In the embodiment, it is set that $X_T$=Window_Size−N, so if the difference value X is greater than the given threshold $X_T$, that is, $X \in$[Window_Size−N, Window_Size], it is indicated that the receiving window is to be full to halt. At this time, if the message serial number of the truncated NACK is not equal to that of the previous NACK in the second status report, the message requested for retransmission by the truncated NACK may be a PDU or a PDU fragment, and the PDU fragment and that requested by the previous NACK do not belong to a same PDU. The two cases (being PDU or PDU fragment) make it unable in this embodiment to utilize the request chance of the previous NACK to represent the request just like the case where the message serial number of the truncated NACK is equal to that of the previous NACK in the second status report, and it is necessary to construct a third status report further according to the position of the truncation site. In this way, even if the receiving window is to be full to halt and the message serial number of the truncated NACK is not equal to that of the previous NACK in the second status report, the retransmission request can be represented properly according to the position of the truncation site.

Preferably, in the described method for message retransmission, step S20 specifically comprises: if the difference value is greater than the given threshold, and the truncated NACK is a first NACK in the second status report, constructing the third status report according to the position of the truncation site.

In the embodiment, it is set that $X_T$=Window_Size−N, so if the difference value X is greater than the given threshold $X_T$, that is, $X \in$[Window_Size−N, Window_Size], it is indicated that the receiving window is to be full to halt. At this time, if the truncated NACK is the first NACK in the second status report, the message requested for retransmission by the truncated NACK may be a PDU or a PDU fragment, however, as the truncated NACK is the first NACK in the second status report, it is unable to utilize the request chance of the previous NACK to represent the request just like the case where the message serial number of the truncated NACK is equal to that of the previous NACK in the second status report, and it is necessary to construct a third status report further according to the position of the truncation site. In this way, even if the receiving window is to be full to halt and the truncated NACK is the first NACK in the second status report, the retransmission request can be represented properly according to the position of the truncation site.

Preferably, in the described method for message retransmission, the step of constructing the third status report according to the position of the truncation site specifically comprises: if the truncation site is within an SO domain of the truncated NACK, abandoning the SO domain in the second status report to obtain the third status report.

The embodiment is applied to the two conditions above: when the difference value is greater than the given threshold and the truncated NACK is the first NACK in the second status report, or when the difference value is greater than the given threshold and the message serial number of the truncated NACK is not equal to that of the previous NACK in the second status report. In the two conditions, it is unable to utilize the request chance of the previous NACK to represent the request, and it is necessary to construct the third status report according to the position of the truncation site.

It is known from the above described status report format that, when a PDU is requested, the corresponding NACK part only contains an NACK_SN; when a PDU fragment is requested, the corresponding NACK part contains an NACK_SN and an SO domain (30 bits), therefore, it needs a longer status report to request for a PDU fragment than a PDU.

If the truncation site is within the SO domain of the truncated NACK, it is indicated that what the truncated NACK requested is a PDU fragment, however, due to limited available bandwidth, it is unable to send the status report containing complete SO domain information, but the NACK_SN before the SO domain is still complete; therefore, when the third status report is constructed in the embodiment, the SO domain is abandoned, that is, the message requested for retransmission is modified to be a PDU containing the PDU fragment, which absolutely also contains the PDU fragment originally requested. In the embodiment, when the truncation site is within the SO domain of the truncated NACK, the retransmission request for the PDU fragment originally requested by the truncated NACK is represented in the status report of this round, thereby accelerating the progress of message retransmission, reducing or even eliminating the possibility that the receiving window is to be full to fall in halt status, and improving the air interface data transmission speed and efficiency.

Preferably, in the described method for message retransmission, the step of constructing the third status report according to the position of the truncation site specifically comprises: if the truncation site is not within the SO domain of the truncated NACK, abandoning the truncated NACK in the second status report to obtain the third status report.

The embodiment is applied to the two conditions above: when the difference value is greater than the given threshold and the truncated NACK is the first NACK in the second status report, or when the difference value is greater than the given threshold and the message serial number of the truncated NACK is not equal to that of the previous NACK in the second status report. In the two conditions, it is unable to utilize the request chance of the previous NACK to represent the request, and it is necessary to construct a third status report further according to the position of the truncation site.

If the truncation site is not within the SO domain of the truncated NACK, that is, the truncation site is within the NACK_SN of the truncated NACK or the E1 or E2 domain, it is unable to request the PDU fragment originally requested by the truncated NACK in the status report of this round; in the embodiment, when the third status report is constructed, the truncated NACK is abandoned, that is, the retransmission request for the PDU or the PDU fragment corresponding to the truncated NACK can be constructed in the status report of next round, thereby saving the air interface transmission resources.

Figure 5:
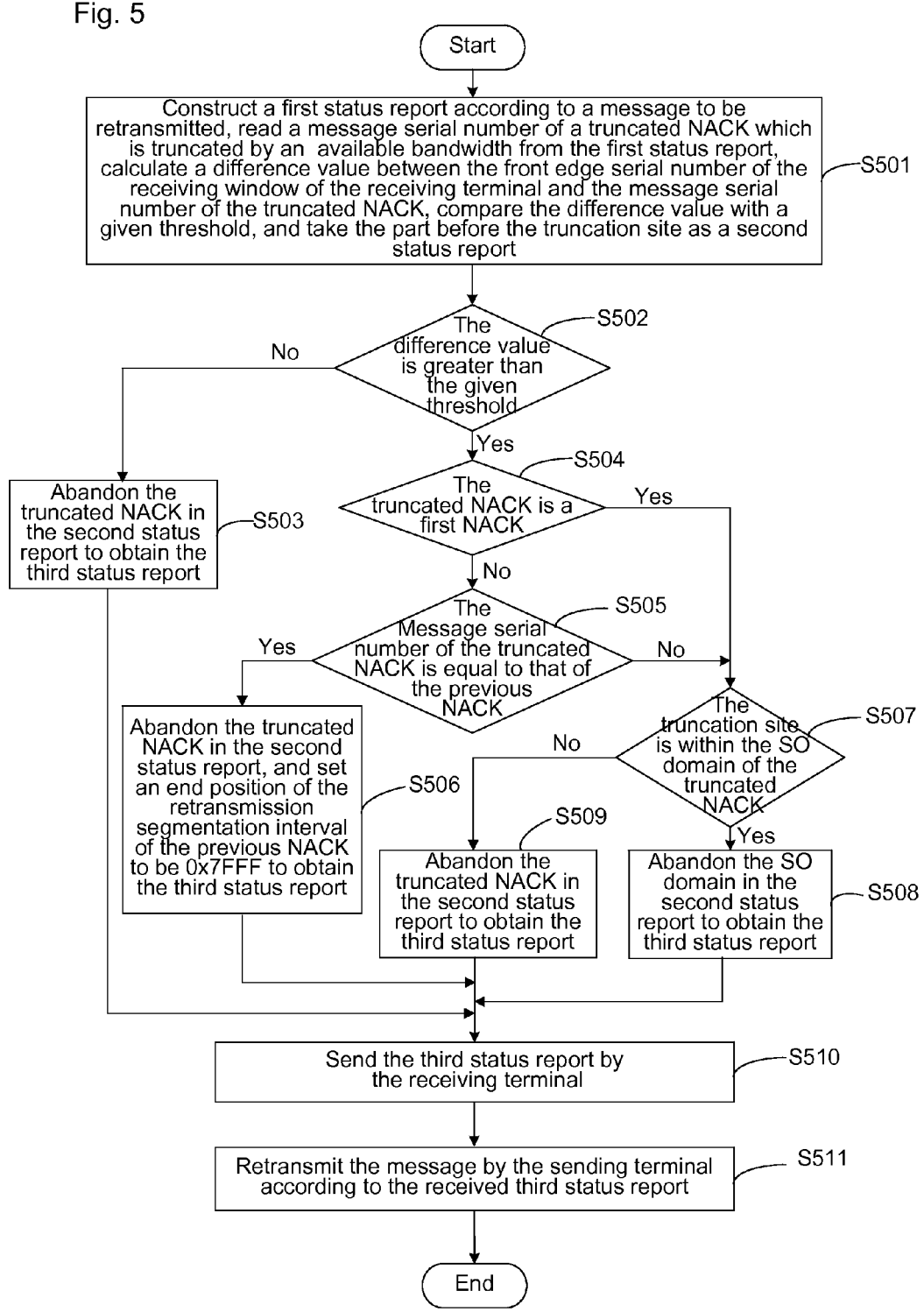
FIG. 5 shows a flow chart of the method for message retransmission according to a preferred embodiment of the present invention.

FIG. 5 shows a flow chart of the method for message retransmission according to a preferred embodiment of the present invention, the method comprises the following steps:

Step S501: constructing a first status report according to a message to be retransmitted, reading a message serial number of a truncated NACK which is truncated by an available bandwidth from the first status report, calculating a difference value between a front edge serial number of a receiving window of a receiving terminal and the message serial number of the truncated NACK, comparing the difference value with a given threshold, and taking the part before the truncation site as a second status report;

Step S502: determining whether the difference value is grater than the given threshold;

Step S503: if the difference value is less than the given threshold, abandoning the truncated NACK in the second status report to obtain a third status report, turning to step S510;

Step S504: if the difference value is greater than the given threshold, determining whether the truncated NACK is a first NACK, if it is, turning to step S507;

Step S505: if the truncated NACK is not the first NACK, continuing to determine whether the message serial number of the truncated NACK is equal to that of the previous NACK in the second status report, if it is not, turning to step S507;

Step S506: if the message serial number of the truncated NACK is equal to that of the previous NACK in the second status report, abandoning the truncated NACK in the second status report, and setting an end position of a retransmission segmentation interval of the previous NACK to be 0x7FFF to obtain the third status report, turning to step S510;

Step S507: determining whether the truncation site is within an SO domain of the truncated NACK;

Step S508: if the truncation site is within the SO domain of the truncated NACK, abandoning the SO domain in the second status report to obtain the third status report, turning to step S510;

Step S509: if the truncation site is not within the SO domain of the truncated NACK, abandoning the truncated NACK in the second status report to obtain the third status report;

Step S510: sending the third status report by the receiving terminal; and

Step S511: retransmitting the message by the sending terminal according to the received third status report.

Figure 1:
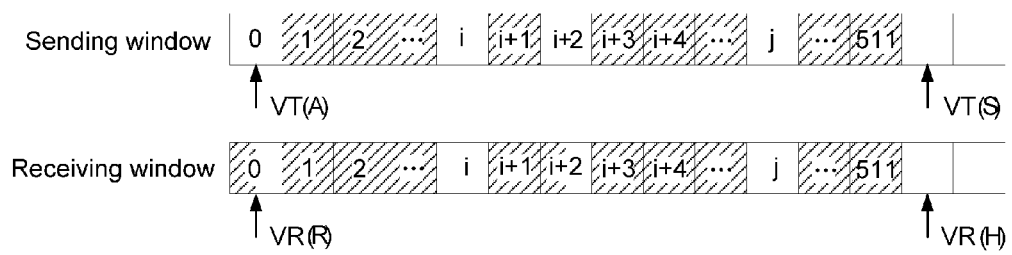
FIG. 1 shows a schematic diagram when the data transmission window stays in moving status in related technologies.
Figure 2:
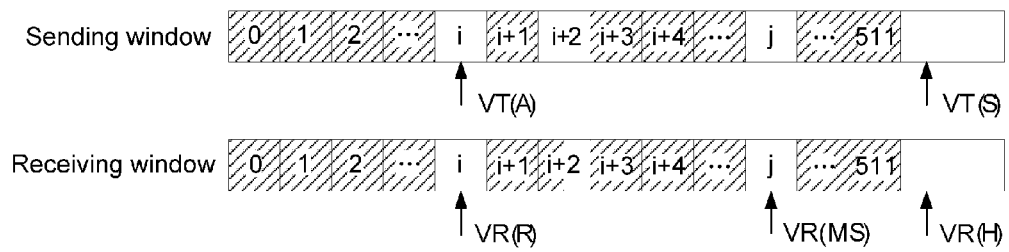
FIG. 2 shows a schematic diagram when the data transmission window stays in halt status in related technologies.
Figure 3:
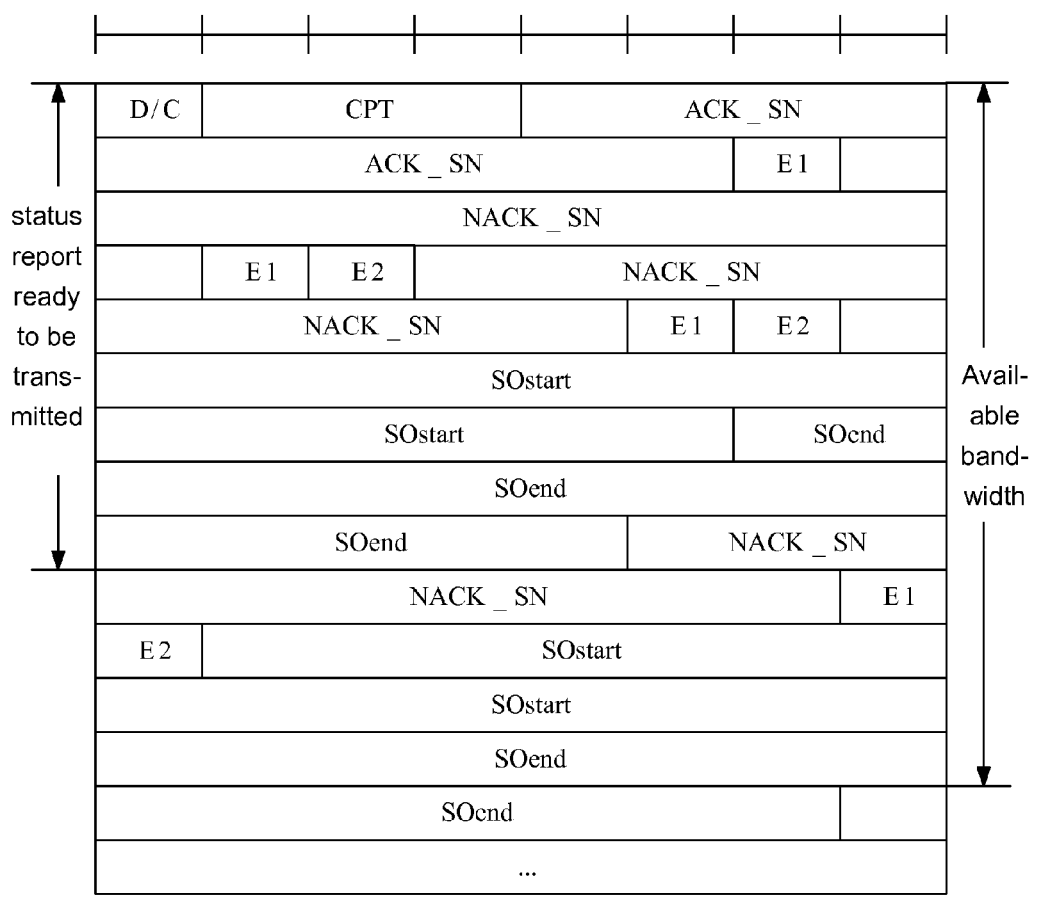
FIG. 3 shows a schematic diagram of a status report in related technologies.
Figure 6:
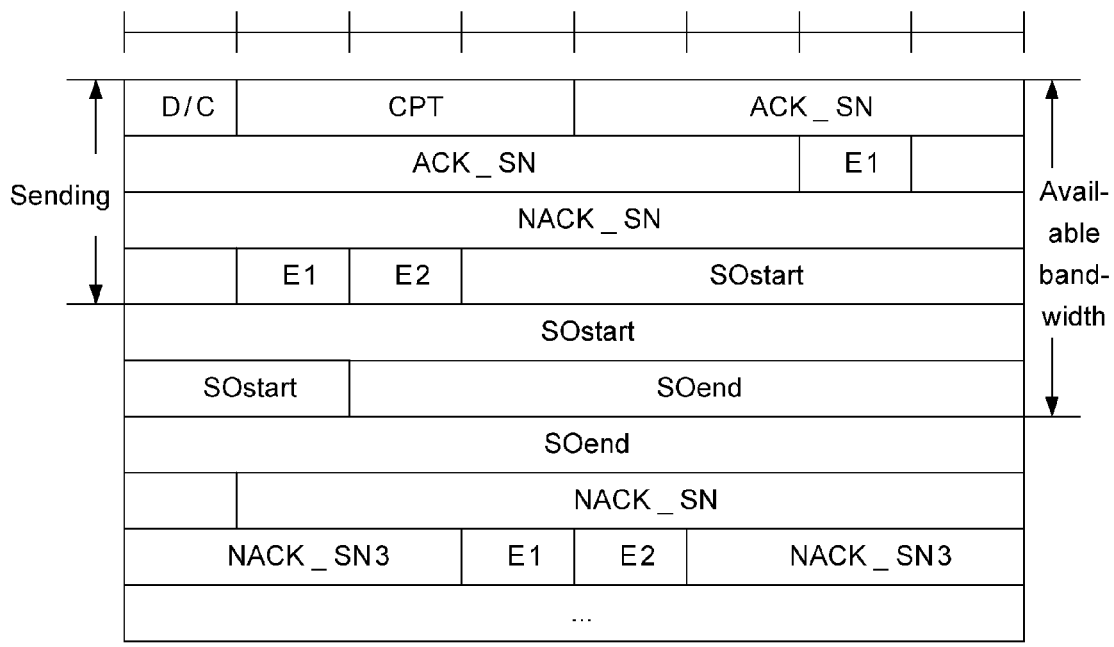
FIG. 6 shows a schematic diagram of a status report corresponding to FIG. 5.

FIG. 6 shows a schematic diagram of a status report corresponding to FIG. 5. In the embodiment, before message retransmission, the receiving window stays in halt status, as shown in FIG. 1. As shown in FIG. 6, the available bandwidth is only 6 bytes, the truncated NACK is the first NACK and the truncation site is within the SO domain of the truncated NACK. Therefore, the steps of the method for message retransmission corresponding to the embodiment are the followings in FIG. 5:

S501→S502→S504→S507→S508→S510→S511. The method for message retransmission will accelerate elimination of halt status of the receiving window and restore the moving status of the receiving window as shown in FIG. 3.

Figure 7:
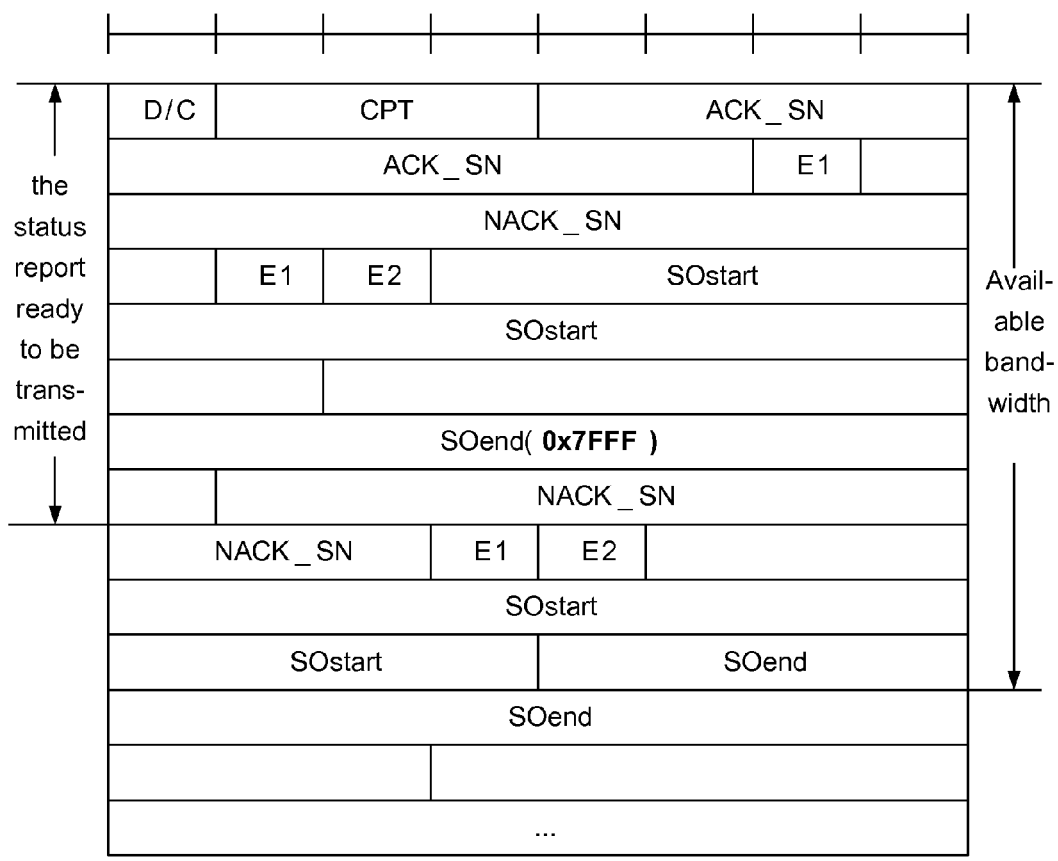
FIG. 7 shows a schematic diagram of another status report corresponding to FIG. 5.

FIG. 7 shows a schematic diagram of another status report corresponding to FIG. 5. In the embodiment, before message retransmission, the receiving window stays in halt status, as shown in FIG. 1. As shown in FIG. 6, the available bandwidth is only 11 bytes, the truncated NACK is the second NACK and the message serial number of the truncated NACK is equal to that of the first NACK in FIG. 7. Therefore, the steps of the method for message retransmission corresponding to the embodiment are the followings in FIG. 5: S501→S502→S504→S507→S508→S510→S511. The method for message retransmission will accelerate elimination of halt status of the receiving window and restore the moving status of the receiving window as shown in FIG. 3.

Figure 8:
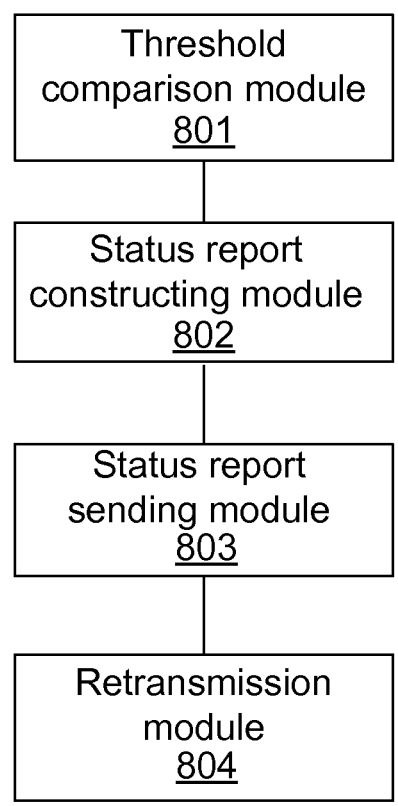
FIG. 8 shows a structural diagram of a device for message retransmission according to an embodiment of the present invention.

FIG. 8 shows a structural diagram of a device for message transmission according to an embodiment of the present invention. The device for message transmission may be applied in a radio link control layer and comprises:

a threshold comparison module 801, for constructing a first status report according to a message to be retransmitted, reading a message serial number of a truncated non-acknowledgement (NACK) which is truncated by the available bandwidth from the first status report, calculating a difference value between the front edge serial number of a receiving window of a receiving terminal and the message serial number of the truncated NACK, comparing the difference value with a given threshold, and taking a part before the truncation site as a second status report;

a status report constructing module 802, for constructing a third status report according to the comparison result and the second status report;

a status report sending module 803, for sending the third status report; and a retransmission module 804, for retransmitting the message according to the received third status report.

In the embodiment, first, the threshold comparison module 801 is employed to calculate the difference value between the front edge serial number of the receiving window of the receiving terminal and the message serial number of the truncated NACK, and compare the difference value with the given threshold. Then, the status report constructing module 802 is employed to adjust the second status report according to the comparison result to obtain a third status report. The status report sending module 803 is employed to send the third status report. Finally, the retransmission module 804 is employed to retransmit the message according to the received third status report. As the comparison result contains the status information of the message transmission window, the device for message retransmission in the embodiment can employ different construction methods with respect to different status of the data transmission window to obtain the third status report; therefore, under various status situations of the data transmission window, air interface data transmission can be performed in time, the air interface data transmission speed and efficiency are improved, and the problem is effectively avoided that in the method for message retransmission in related technologies, the NACK truncated by the available bandwidth is abandoned no matter under which status of the data transmission window, resulting in air interface data transmission delay and low transmission speed under a case in which the window is to be full to halt.

Figure 9:
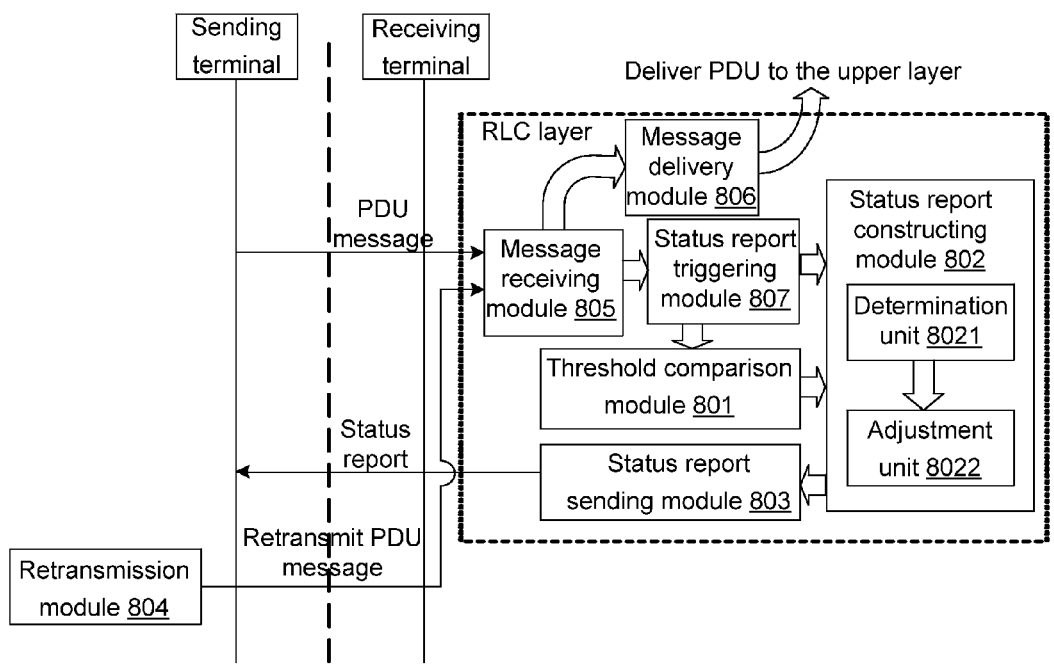
FIG. 9 shows a structural diagram of the device for message retransmission according to a preferred embodiment of the present invention.

FIG. 9 shows a structural diagram of a device for message retransmission according to a preferred embodiment of the present invention, wherein the status report constructing module 802 specifically comprises: a determination unit 8021 for determining a status of the message to be retransmitted according to the comparison result and the position relationship among the truncation site, the truncated NACK and the first status report; and an adjustment unit 8022 for adjusting the second status report according to the status of the message to be retransmitted to obtain the third status report.

As the comparison result contains the status information of the data transmission window, in the embodiment, the determination unit is employed to determine the status of the message to be retransmitted according to the status information of the data transmission window in combination with the position relationship among the truncation site, the truncated NACK and the first status report, and then the adjustment unit is employed to adjust the second status report according to the status of the message to be retransmitted to obtain the third status report.

Specifically, the status of the message to be retransmitted includes:

1) if $X \in [0, X_T)$, it is indicated that the receiving window is in good moving status;

2) if $X \in [X_T, \text{Window\_Size}]$, it is indicated that the receiving window is to be full to halt, at this time, it is necessary to further determine the status of the message to be retransmitted:

2.1) the message serial number of the truncated NACK is equal to that of the previous NACK in the second status report;

2.2) the message serial number of the truncated NACK is not equal to that of the previous NACK in the second status report: the truncation site is within the SO domain of the truncated NACK; the truncation site is not within the SO domain of the truncated NACK; and 2.3) the truncated NACK is the first NACK in the second status report: the truncation site is within the SO domain of the truncated NACK; the truncation site is not within the SO domain of the truncated NACK.

According to various status of the message to be retransmitted, different construction ways can be employed to obtain the third status report, therefore, in the embodiment, in various cases no matter whether the receiving window is in moving status or halt status, whether the message serial number of the truncated NACK is equal to that of the previous NACK in the second status report, whether the truncated NACK is the first NACK in the second status report, or whether the truncation site is within the SO domain of the truncated NACK, the air interface data transmission can be performed in time, and the air interface data transmission speed and efficiency are improved.

As shown in FIG. 9, the device for message retransmission further comprises: a message receiving module 805 for receiving the message from the sending terminal; a message delivery module 806 for delivering the message; and a status report triggering module 807 for triggering the first status report according to the message.

In the embodiment, after the sending terminal sends the PDU message, and the message receiving module 805 at the receiving terminal receives the message, on one hand, the message is output to the message delivery module 806 to deliver the received PDU message to the upper layer, on the other hand, output to the status report triggering module 807 to trigger the first status report. After the threshold comparison module 801 receives the triggering signal, it starts to perform comparison according to the threshold and outputs the comparison result to the status report constructing module 802 to construct the third status report and pass the third status report to the status report sending module 803, and then the status report sending module 803 sends the third status report to the sending terminal, and the retransmission module 804 at the sending terminal retransmits the PDU message according to the received third status report.

In conclusion, under various status situations of the data transmission window, the air interface data transmission can be performed in time, and the air interface data transmission speed and efficiency are improved according to the embodiments of the present invention.

Obviously, those skilled in the art should understand that the above modules or steps of the present invention could be achieved through general calculating devices, they can be concentrated in a single calculating device or distributed in a network formed by multiple calculating devices, optionally, they can be achieved by program codes executable by calculating devices, thus, they can be stored in storage devices to be executed by the calculating devices, or they can be achieved by respectively making them into many integrated circuit modules or by making multiple modules or steps among them into a single integrated circuit module. In this way, the present invention is not limited to any combinations of specific hardware and software.

Above contents are only preferred embodiments of the present invention and are not used for limiting the present invention. For those skilled in the art, the present invention can have various modifications and changes. Any modifications, equivalent replacements and improvements within the principle of the present invention should be contained within the protection scope of the present invention.

What is claimed is:

1. A method for message retransmission, comprising:
   constructing a first status report by a receiving terminal according to a message to be retransmitted, reading a message serial number of a truncated non-acknowledgement (NACK) which is truncated by an available bandwidth from the first status report, calculating a difference value between a front edge serial number of a receiving window of the receiving terminal and the message serial number of the truncated NACK, comparing the difference value with a given threshold, and taking a part before a truncation site as a second status report;
   constructing a third status report according to a comparison result and the second status report;
   sending the third status report by the receiving terminal; and
   retransmitting the message by a sending terminal according to the received third status report,
   wherein the step of constructing the third status report according to the comparison result and the second status report comprises:
   if the difference value is less than the given threshold, abandoning the truncated NACK in the second status report to obtain the third status report;
   if the difference value is greater than the given threshold and the message serial number of the truncated NACK is equal to that of a previous NACK in the second status report, abandoning the truncated NACK in the second status report, and setting an end position of a retransmission segmentation interval of the previous NACK to be 0x7FFF to obtain the third status report;
   if the difference value is greater than the given threshold and the message serial number of the truncated NACK is not equal to that of the previous NACK in the second status report, constructing the third status report according to a position of the truncation site;

if the difference value is greater than the given threshold and the truncated NACK is a first NACK in the second status report, constructing the third status report according to the position of the truncation site.

2. The method for message retransmission according to claim 1, wherein the step of constructing the third status report according to the position of the truncation site comprises:
if the truncation site is within an SO domain of the truncated NACK, abandoning the SO domain in the second status report to obtain the third status report.

3. The method for message retransmission according to claim 1, wherein the step of constructing the third status report according to the position of the truncation site comprises:
if the truncation site is not within an SO domain of the truncated NACK, abandoning the truncated NACK in the second status report to obtain the third status report.

4. A device for message retransmission, comprising:
a threshold comparison module, for constructing a first status report according to a message to be retransmitted, reading a message serial number of a truncated non-acknowledgement (NACK) which is truncated by an available bandwidth from the first status report, calculating a difference value between a front edge serial number of a receiving window of a receiving terminal and the message serial number of the truncated NACK, comparing the difference value with a given threshold, and taking a part before a truncation site as a second status report;
a status report constructing module, for constructing a third status report according to a comparison result and the second status report;
a status report sending module, for sending the third status report; and
a retransmission module, for retransmitting the message according to the received third status report,
wherein the status report constructing module is specifically configured for:
if the difference value is less than the given threshold, abandoning the truncated NACK in the second status report to obtain the third status report;
if the difference value is greater than the given threshold and the message serial number of the truncated NACK is equal to that of a previous NACK in the second status report, abandoning the truncated NACK in the second status report, and setting an end position of a retransmission segmentation interval of the previous NACK to be 0x7FFF to obtain the third status report;
if the difference value is greater than the given threshold and the message serial number of the truncated NACK is not equal to that of the previous NACK in the second status report, constructing the third status report according to a position of the truncation site;
if the difference value is greater than the given threshold and the truncated NACK is a first NACK in the second status report, constructing the third status report according to the position of the truncation site.

5. The device for message retransmission according to claim 4, further comprising:
a message receiving module, for receiving the message from a sending terminal;
a message delivery module, for delivering the message; and
a status report triggering module, for triggering the first status report according to the message.

* * * * *